United States Patent [19]

Ashland

[11] Patent Number: 4,460,858
[45] Date of Patent: Jul. 17, 1984

[54] AUTOPILOT ROLL CONTROL WHEEL STEERING SYSTEM

[75] Inventor: Robert F. Ashland, Bellevue, Wash.

[73] Assignee: The Boeing Company, Seattle, Wash.

[21] Appl. No.: 377,103

[22] Filed: May 11, 1982

[51] Int. Cl.$^3$ .................. B64C 13/18; G05D 1/08
[52] U.S. Cl. .................... 318/585; 318/591; 318/616; 244/197
[58] Field of Search ............ 364/160; 318/585, 591, 318/616, 628; 244/197

[56] References Cited

U.S. PATENT DOCUMENTS

| | | | |
|---|---|---|---|
| 2,450,907 | 10/1948 | Newton | 318/585 |
| 2,602,611 | 7/1952 | Glenny | 318/585 |
| 2,664,530 | 12/1953 | Young | 318/591 |
| 2,784,924 | 3/1957 | Gille | 318/585 |
| 2,797,379 | 6/1957 | Young | 318/616 |
| 2,827,605 | 3/1958 | Alderson | 318/591 |
| 2,835,861 | 5/1958 | Eckhardt | 318/585 |
| 2,850,692 | 9/1958 | Hudson | 318/591 |
| 2,851,645 | 9/1958 | Owen | 318/591 |
| 2,934,688 | 4/1960 | Haerther | 318/591 |
| 3,003,720 | 10/1961 | Chase | 244/197 |
| 3,199,013 | 8/1965 | Brahm et al. | 318/591 |
| 3,450,970 | 6/1969 | Younkin | 318/585 |
| 3,510,092 | 5/1970 | Hendrick et al. | 318/591 |
| 3,730,461 | 5/1973 | Knemeyer | 318/585 |
| 3,788,579 | 1/1974 | Sliney | 244/197 |
| 3,807,666 | 4/1974 | Devlin | 318/591 |
| 3,837,603 | 9/1974 | Schultz et al. | 318/585 |
| 3,925,640 | 12/1975 | Duggan | 318/585 |
| 4,148,452 | 4/1979 | Niessen et al. | 318/585 |
| 4,234,142 | 11/1980 | Yost et al. | 318/585 |
| 4,283,670 | 8/1981 | Durand | 318/591 |

Primary Examiner—B. Dobeck
Attorney, Agent, or Firm—James P. Hamley; Bernard A. Donahue

[57] ABSTRACT

An autopilot control system includes roll rate synchronization circuitry for precisely responding to control wheel roll commands without overshoots. Unique fade-in/fade out circuitry prevents transient signal "bumps" upon mode switching of the system.

11 Claims, 1 Drawing Figure

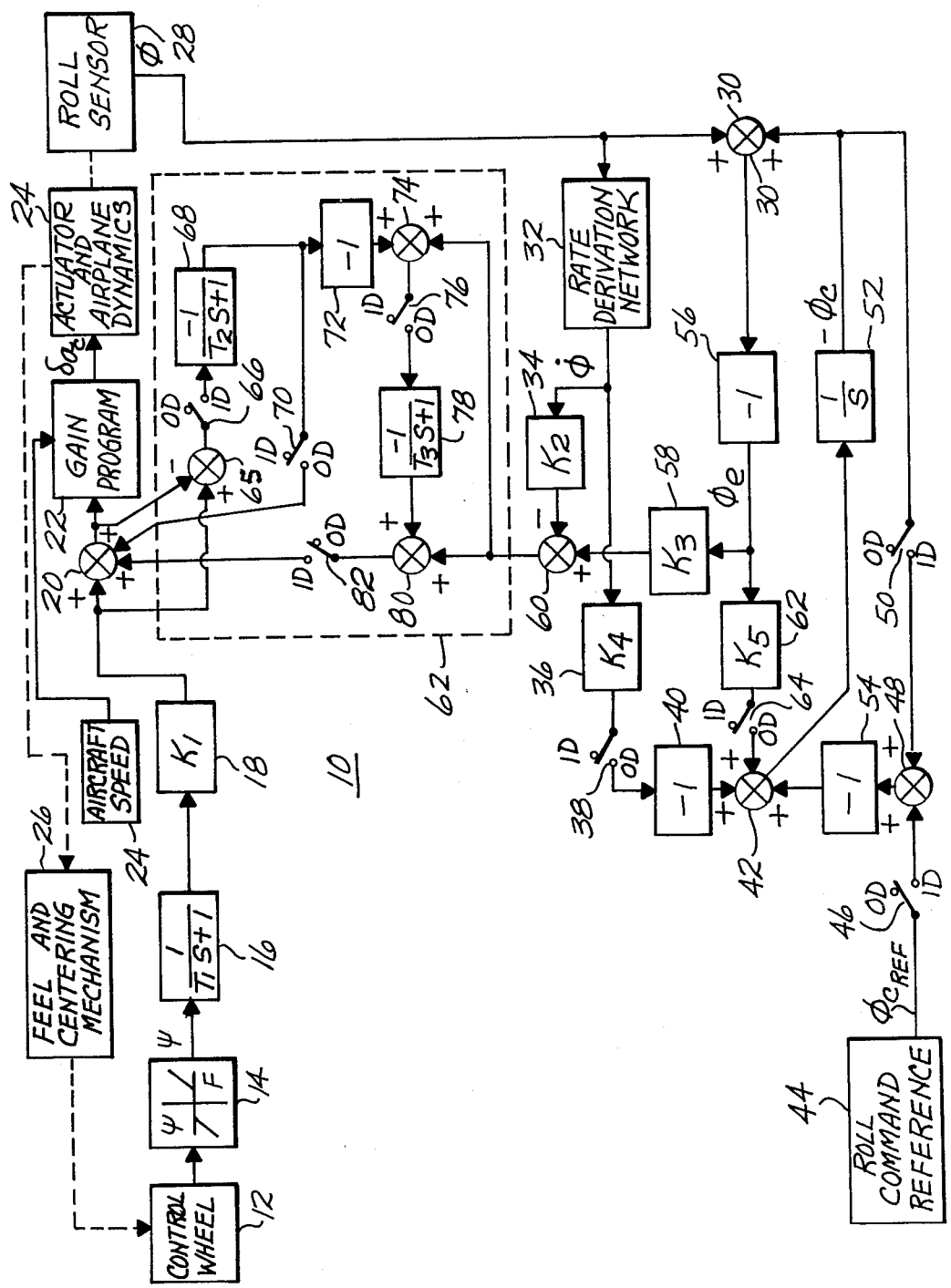

AUTOPILOT ROLL CONTROL WHEEL STEERING SYSTEM

BACKGROUND OF THE INVENTION

The present invention pertains to the aircraft flight control art and, more particularly, to an improved autopilot roll control wheel steering system.

Aircraft autopilot roll control wheel steering systems are well-known in the prior art. Such systems allow the pilot, when the aircraft is in the autopilot mode, to enter a roll command via his control wheel. Ideally, the autopilot responds to the roll command by rolling the aircraft to the desired roll angle.

Prior art control wheel steering systems have not, however, always responded to the pilot's command in a precise manner. Some of these systems suffer a significant error between the roll command and the actual roll angle during rapid rolling maneuvers. Thus, if the pilot attempts to rapidly roll the aircraft to a desired roll angle, the roll command causes the aircraft to roll to and settle on a roll angle different from that desired. Also, some of these systems do not compensate for the natural tendency of the aircraft to overshoot the deired roll angle due to inertia effects. In addition, many prior art systems are subject to control wheel and aircraft control surface transients caused by signal switching.

A further limitation with some prior art systems is that they allow control wheel "jiggle" during roll commands by the pilot. Control wheel jiggle is caused as a result of the autopilot correcting for turbulence and aircraft maneuver effects. This jiggle causes a mechanical motion on the control wheel which tends to oppose the pilot's input, thereby leading to less than precise steering maneuvers.

SUMMARY OF THE INVENTION

It is an object of this invention, therefore, to provide an improved autopilot control wheel steering system which is capable of precisely controlling the aircraft to a commanded roll angle without excessive overshoots, regardless of roll command rate.

It is a further object of the invention to provide the above-described control wheel steering system, which system is not susceptible to control wheel and aircraft control surface transients.

It is an additional object of the invention to provide the above-described improved control wheel steering system, which system should not subject the control wheel to wheel jiggle during roll commands by the pilot.

Briefly, according to the invention, the autopilot roll command steering system controls aircraft roll in response to a control wheel roll command. The system includes a transducer for producing an output signal $\psi$ representative of the control wheel roll command. A signal $\phi$ is produced representing aircraft roll position. A roll rate signal $\dot{\phi}$, representative of the first time differential of the $\phi$ signal is produced. An integrator produces an output signal $\phi_c$ equal to the time integral of the signal at its input. A roll error signal $\phi_e$ equal to the difference between $\phi_c$ and $\phi$ is produced. The $\dot{\phi}$ and $\phi_e$ signals are coupled to the input of the integrator. A command signal which is proportional to the sum of the $\psi$, $\phi_e$ and $\dot{\phi}$ signals is produced and this signal is coupled to the aircraft's control surfaces to control roll of the aircraft.

BRIEF DESCRIPTION OF THE DRAWINGS

The single FIGURE illustrates, in block diagram form, the preferred construction of the improved roll control wheel steering system.

DETAILED DESCRIPTION OF THE PREFERRED EMBODIMENT OF THE INVENTION

Referring to the single figure, the improved autopilot control wheel steering system, shown in block diagram form, is indicated generally at 10. Here, in the normal manner, the pilot enters a desired roll command by applying a force F to his conrtrol wheel 12. A transducer and "dead zone" circuitry 14, associated with the control wheel 12, produces an output signal $\psi$. This signal follows the graph within block 14. That is, for relatively small forces on the wheel, the $\psi$ signal is a constant level, here zero. This is commonly known as the "in-detent" mode of the control wheel. When the force exceeds the in-detent limits, the signal $\psi$ varies in a linear relationship with applied force, and is referred to as the "out-of-detent" mode.

The control wheel signal $\psi$ is next passed through a low pass filter 16, having a time constant $T_1$. Such filters have been used in prior systems and provide a means to prevent the pilot from constantly going into and and out of the in-detent mode as he rotates the control wheel with a relatively light force. A particular feature of the present invention is that the time constant $T_1$ varies as a function of whether the control wheel is in or out of detent. Thus, in one application:

$$T_1 = 1.5 \text{ second (in-detent)}$$
$$= 0.5 \text{ second (out-of-detent)}.$$

By reducing the time constant in the out-of-detent mode, the control wheel exhibits a much lighter "feel" to the pilot, giving him the impression of less force to fly the aircraft to a desired roll angle.

The signal out of filter 16 is amplified by a gain factor $K_1$, in amplifier 18, and provided as one input to a summer circuit 20.

Summer circuit 20, acting in the conventional manner, sums the signals at its inputs, and produces an output resultant signal which is applied as an input to the gain program amplifier 22. At higher speeds, the aircraft's control surfaces require less deflection to achieve a desired roll rate. Thus, the gain of gain program amplifier 22 is adjusted by aircraft speed, as provided by speed sensor 24, and reduces its gain factor for increasing speeds. The reduced gain factor compensates for the increased effect of the control surfaces with increasing speed, whereby the control wheel has a constant wheel force to aircraft roll response relationship.

The output from gain program amplifier 22 is an aileron command signal $\delta a_c$. This signal is applied to a conventional actuator causing an appropriate deflection of the ailerons and resultant airplane dynamics indicated at block 24. In the conventional manner, with the autopilot disengaged, a feel and centering mechanism 26 provides a feel to the control wheel 12 which is mechanically connected to the actuator 24.

The aircraft's actual roll, created by the actuator and airplane dynamics 24, is sensed by a roll sensor 28 (such as a vertical gyro) which produces a corresponding signal $\phi$. The signal $\phi$ is fed as one input to a summer circuit 30 and as an input to a rate derivation network 32. Network 32 takes the time differential of the input signal $\phi$, thereby producing a roll rate signal $\dot\phi$. The roll rate signal $\dot\phi$ is applied as one input to an amplifier 34, having a fixed gain $K_2$, and as an input to fixed gain amplifier 36, having a gain factor $K_4$.

The output from amplifier 36 is connected to a switch 38. Switch 38 is opened when the control wheel is in its in-detent mode, closing during out-of-detent operation. When switch 38 is closed, the output from amplifier 36 is multiplied by a gain factor of $-1$ in a fixed gain amplifier 40, and is applied as one input to a summer 42.

One input to summer circuit 48 couples through a switch 50 to the output of an integrator 52. Integrator 52 produces a negative roll command output signal $-\phi_c$ which is equal to the time integral of the signal applied to the integrator input. Here, the integrator input is the output of summer circuit 42. This signal $-\phi_c$ is applied as an input to summer 30 and, as mentioned, through switch 50 to summer 48. Switch 50 is closed during the in-detent control wheel mode, and is opened during the out-of-detent mode.

Roll command reference circuitry 44, acting in the conventional manner, produces an output signal $\phi_{cREF}$ having a value equal to the last out-of-detent roll command signal $\phi_c$. This $\phi_{cREF}$ signal is passed to a switch 46 which is open during the control wheel out-of-detent mode, and closes during the in-detent mode. During the in-detent mode, the roll command reference signal $\phi_{cREF}$ is applied as one input to the summer circuit 48.

The output of summer 48 is multiplied by a fixed gain factor $-1$ in fixed gain amplifier 54, with the resultant signal being applied as an input to summer 42.

The signal out of summer 30, which is effectively the difference between the aircraft's actual roll angle $\phi$ and the commanded roll angle $\phi_c$, after being multiplied by a gain of $-1$ in amplifier 56, is the roll error signal $\phi_e$. The roll error signal is amplified by a gain factor $K_3$ in fixed gain ampllifier 58 with the resultant being coupled as one input to summer circuit 60. The remaining input to summer 60, in the negative sense, is the roll rate signal $\dot\phi$ multiplied by the fixed gain amplifier 34.

The roll error signal $\phi_e$ is also amplified by a fixed gain factor $K_5$ in fixed gain amplifier 62. The output from amplifier 62 is applied to switch 64 which is closed in the out-of-detent mode, while being open in the in-detent mode, and coupled to summer 42.

The output from summer 60 is coupled through fade-in/fade-out circuitry, generally indicated at 62, before being coupled as an input to summer 20. The fade-in/fade-out circuitry, which eliminates transient signals from being applied to the control wheel and aircraft control surfaces as a result of switching transitions between the out-of-detent and in-detent mode, includes a summer 65 which takes the difference between the signal at the output of amplifier 18 and the output from summer 20. This difference signal is coupled to a switch 66 which is closed in the in-detent mode and open in the out-of-detent mode. Switch 66 couples to a low pass filter 68 having a gain of $-1$ and a time constant $T_2$. This time constant is a function of the mode of the control wheel, with its value being much lower for in-detent mode operation. Thus, in one construction of the present invention, $T_2 = .012$ second (in-detent)

$= 1.5$ second (out-of-detent).

Thus, during in-detent operation the filter is quick to produce an output level corresponding to the input signal, whereas the output signal decays relatively slowly during out-of-detent mode operation.

The output from filter 68 is coupled to a switch 70 which is closed during out-of-detent mode operation. Switch 70, in turn, connects as one input to the summer 20.

The output from filter 68 is also applied at the input to fixed gain amplifier 72, having a gain factor $-1$. The output from amplifier 72 is coupled as an input to summer 74, whose remaining input is the output from summer 60. The output from summer 74 is coupled to a switch 76 which is closed during out-of-detent mode operation and open during in-detent mode operation. Switch 76 connects, in turn, to a low pass filter 78 having a gain of $-1$ and a time constant $T_3$. The time constant $T_3$ of filter 78 is a function of the control wheel mode, with the value being much less for out-of-detent operation. In one construction of the invention:

$T_3 = 1.5$ second (in-detent)

$= .012$ second (out-of-detent).

Thus, the output from filter 78 quickly assumes the input signal level for out-of-detent operation, having a relatively slow decay for in-detent operation.

The output from filter 78 is applied as an input to summer 80, whose remaining input is the ouput of summer 60. The output from summer 80 is connected to a switch 82 which closes only for in-detent mode operation. The output from switch 82 is applied as the remaining input to summer 20.

System operation may be understood as follows.

The pilot creates an aileron command by applying an appropriate force to his control wheel 12. This force, assuming it exceeds the in-detent value, results in a corresponding signal $\psi$ out of transducer 14. The signal $\psi$, after being low pass filtered in filter 16 and amplified in amplifier 18, is directly connected through summer 20 and gain program 22 as an input signal to the actuator and airplane dynamics 24. In contrast with some prior art systems, the signal $\psi$ is not directly passed through an integrator and, as such, the present system prevents excessive autopilot actuator cam-out conditions experienced by some previous systems.

Also, by eliminating the command signal $\psi$ from the input to a control integrator, settling on an undesired roll angle, experienced by some previous systems, is avoided.

During in-detent operation, the sole input to integrator 52 is the negative sum of the roll command reference signal $\phi_{cREF}$ and the output of integrator 52. Thus, the output signal of integrator 52, when compared with the aircraft's actual roll angle $\phi$ as applied by roll sensor 28, produces the error signal $\phi_e$ which, as amplified by amplifier 58, creates the error signal which is ultimately applied to summer 20. The aircraft is, thus, caused to fly in a manner reducing $\phi_e$ to zero, thereby causing $\phi$ to equal $\phi_c$.

Also coupled as a feedback signal to summer 20 during in-detent operation is the roll rate signal $\dot\phi$ as multiplied by amplifier 34. This loop provides damping to rapidly and smoothly return the aircraft roll angle to the roll command reference $\phi_{cREF}$ after a turbulence upset or a roll maneuver.

Since switch 82 is closed only for in-detent operation, any $\phi_e$ and $\phi$ signals caused by autopilot response to turbulence or aircraft maneuvers are prevented from creating control wheel steering inputs during the out-of-detent mode. Thus, the pilot, in attempting to enter a control wheel command, is not opposed by control wheel jiggle.

During out-of-detent mode operation, switches 38 and 64 are closed, whereby the input to integrator 52 corresponds to the roll error and roll rate signals, $\phi_e$ and $\phi$, respectively. Thus, the output from integrator 52, which has as its initial condition the last commanded in-detent value, as provided by roll command reference circuit 44, produces an out-of-detent mode control signal $\phi_c$ which reflects both roll error and roll rate. In so doing, the system synchronizes the $\phi_e$ signal proportional to roll rate. As a result, the command signal produced by integrator 52 takes into account the rate at which the aircraft is rolling. Thus, by proper adjustment of the gain factor of amplifier 36, the system is made to "anticipate" the roll command of the pilot such that the aircraft is caused to roll to the commanded angle without excessive overshoot.

Fade-in/fade-out circuitry 62 operates as follows. Assume first that the system is in its in-detent mode whereby the output from summer 80 produces a signal X which is coupled through switch 82 to the summer 20 and, as such, to the aircraft's control surface. This signal X will appear at the output of filter 68, which is operating in its small time constant mode. Upon the system then switching to its out-of-detent mode, switch 82 opens, removing the signal X. But for the action of filter 68, the removal of the signal X would cause a transient to be applied through summer 20 causing a transient "bump" on the control wheel and the aircraft control surface and, thus, in the aircraft response. Filter 68, however, provides the stored value X through switch 70 to the summer 20. The signal then decays at the rate determined by the larger value of time constant $T_2$.

Now assume that filter 78 doesn't exist and the system is in its out-of-detent mode whereby a signal X is produced at the output of summer 60 and thus at the output of summer 80, but this signal is prevented from being coupled to summer 20 via switch 82. If the system were suddenly switched to its in-detent mode, switch 82 would close, thereby applying the signal X to summer 20 and, thus, to the control wheel and aircraft control surfaces, thereby also creasing a transient "bump".

To prevent this transient, the filter 78, with $T_3$ at its smaller value, produces at its output the value of the signal X but with a negative sign. This, coupled to the summer 80, exactly cancels the signal X out of summer 60, such that when switch 82 closes upon in-detent mode operation, no transient is coupled to the aircraft's dynamics. As with filter 68, the stored value of the signal X out of filter 78 decays at a rate determined by its greater time constant, thereby providing a smooth switching transition. The signal path through amplifier 72 is provided to eliminate any switching transients that would occur if the output of amplifier 68 had not decayed to zero when switching to the in-detent mode.

In summary, an improved autopilot control wheel steering system has been described in detail. This system precisely responds to the pilot's control input without excessive overshoots regardless of commanded roll rate. In addition, control wheel and aircraft control surface transients are eliminated as is control wheel jiggle during roll commands by the pilot.

While a preferred embodiment of the invention has been described in detail, many modifications and variations to the present invention are possible, all of which fall within the true spirit and scope of the invention.

I claim:

1. An autopilot roll command steering system for controlling aircraft roll in response to control wheel roll command, the system comprising:

transducer means for producing an output signal representative of the control wheel roll command;

means for producing a signal $\phi$ representative of the aircraft's roll position;

means for producing a signal $\phi$ representative of the first time differential of said $\phi$ signal;

integrator means for producing an output signal $\phi_c$ equal to the time integral of the signal at its input;

means for taking the difference between said $\phi_c$ and $\phi$ signals and producing a roll error signal $\phi_e$;

means for coupling said $\phi$ and $\phi_e$ signals to the input of the integrator means; and means for producing a signal proportional to the sum of said $\psi$, $\phi_e$ and $\phi$ signals, and coupling the resultant signal to the aircraft control surfaces to control roll of the aircraft.

2. The system of claim 1 wherein the transducer means further comprises:

dead zone circuitry operable in an in-detent mode for producing a fixed level signal $\psi$ in response to a control wheel command input less than a predetermined level, the dead zone circuitry otherwise operable in an out-of-detent mode producing a signal $\psi$ having a level proportional to the control wheel command input.

3. The system of claim 2 wherein the transducer means further comprises:

filter means for processing said $\psi$ through a low pass filter having a first time constant $T_{1A}$ when said dead zone circuitry is operating in its out-of-detent mode and a second time constant $T_{1B}$ when said dead zone circuitry is operating in its in-detent mode, where $T_{1A} < T_{1B}$.

4. The system of claim 3 wherein:

$T_{1A} \simeq 0.5$ seconds, and
   $T_{1B} \simeq 1.5$ seconds.

5. The system of claim 2 further comprising:

means for producing a signal $\phi_{cREF}$ representative of the last out-of-detent roll command signal $\phi_c$;

switching means for switching the negative sum of said $\phi_{cREF}$ and the output of said integrator means as the sole input to said integrator means in response to said dead zone circuitry operating in its in-detent mode, the switching means responsive to the dead zone circuitry operating in its out-of-detent mode for coupling said roll error and roll rate signals, $\phi_e$ and $\phi$, to the input of the integrator means.

6. The system of claim 5 wherein the switching means further comprises:

means for switching said $\psi$ signal as the sole signal to the aircraft control surfaces in response to said dead zone circuitry operating in its out-of-detent mode, the switching means otherwise coupling a signal proportional to the sum of said $\psi$, $\phi_e$ and $\phi$ signals to the aircraft control surfaces.

7. The system of claim 6 further comprising:

fade-in/fade-out circuitry means for preventing a transient signal from being coupled to the aircraft's control surface as a result of the switching of said switching means.

8. The system of claim 7 wherein the fade-in/fade-out circuitry comprises:
first circuit means responsive to the dead zone circuitry operating in its in-detent mode for sensing the signal level applied to the aircraft control surfaces and, in response to the dead zone circuitry switching to its out-of-detent mode, applying a signal having the same level as the sensed signal to the aircraft control surface, said applied signal having a predetermined decay characteristic.

9. The system of claim 8 wherein the fade-in/fade-out circuitry further comprises:
second circuit means, responsive to the dead zone circuitry operating in its out-of-detent mode, for sensing and cancelling the level of the signal proportional to $\phi_e$ and $\phi$ which would be coupled to the aircraft's control surface upon the dead zone circuitry switching to its in-detent mode, the applied signal having a predetermined decay characteristic.

10. The system of claim 6 including amplifier means for amplifying said $\psi$, $\phi$, and $\phi_e$ signals by predetermined gain constants $K_1$, $-K_2$ and $K_3$ such that the signal coupled to the aircraft's control surface is of the form:

$K_1\psi - K_2\phi + K_3\phi_e$, for in-detent operation, and
$K_1\psi$, for out-of-detent operation.

11. The system of claim 10 including further amplifier means for amplifying said $\phi$ and $\phi_e$ signals by predetermined gain factors $-K_4$ and $K_5$, such that the input signal to the integrator means is of the form:

$-K_4\phi + K_5\phi_e$ for out-of-detent operation
wherein the gain factor $-K_4$ is selected to minimize a transient signal from being coupled to the aircraft's control surface upon the dead zone circuitry transitioning from its out-of-detent to in-detent modes following a constant roll rate maneuver.

* * * * *